United States Patent [19]
Foote

[11] 3,797,802

[45] Mar. 19, 1974

[54] RADIATION MEASURING SYSTEM UTILIZING A CHARGE SENSITIVE AMPLIFIER

[75] Inventor: Robert S. Foote, Dallas, Tex.

[73] Assignee: Geodata International, Inc., Dallas, Tex.

[22] Filed: Jan. 21, 1972

[21] Appl. No.: 219,734

Related U.S. Application Data

[63] Continuation-in-part of Ser. No. 37,582, May 15, 1970, abandoned.

[52] U.S. Cl............................................ 250/71.5 R
[51] Int. Cl................................................ G01t 1/20
[58] Field of Search..... 250/71.5 R, 83.6 R, 83.6 W

[56] References Cited
UNITED STATES PATENTS
| | | | |
|---|---|---|---|
| 3,626,183 | 12/1971 | Berry et al. | 250/83.6 W |
| 2,288,718 | 7/1942 | Kallmann et al. | 250/83.6 R |
| 2,340,967 | 2/1944 | Langer | 250/83.6 R |

OTHER PUBLICATIONS

U.S. Dept. of Commerce, Office of Technical Services, Detection and Measurement of Nuclear Radiation, NAS-NS-3105.

Primary Examiner—James W. Lawrence
Assistant Examiner—Davis L. Willis
Attorney, Agent, or Firm—Joe E. Edwards; Jack R. Springgate; Julian Clark Martin

[57] ABSTRACT

The method and apparatus for measuring pulsed electric charges, such as the charges from a radiation detection device, which charges originate at a point remote from the place of measurement, including transmitting the charges from their source to the place of measurement, amplifying the charges with a charge sensitive preamplifier and measuring the characteristics of the charges.

8 Claims, 2 Drawing Figures

RADIATION MEASURING SYSTEM UTILIZING A CHARGE SENSITIVE AMPLIFIER

BACKGROUND OF THE INVENTION

This application is a continuation-in-part of my co-pending application Ser. No. 37,582, filed May 15, 1970, and now abandoned entitled "Method and Apparatus for Measurement of Any Pulsed Electric Charge Originating Remote From Place of Measurement."

The present invention relates to a method and apparatus for measuring pulsed electric charges originating at a point remote from the point of measurement and has application to remote radiation detection.

Prior practices generally have used voltage as a measure of the output of pulsed radiation detection devices. However, when such devices are located at a sufficiently great distance from the place of measurement, the voltage is attenuated to such a degree that measurement is no longer meaningful. Accordingly, those skilled in the art have had to devise complicated methods and apparatus for transmitting the electrical signals which correspond to the measured output of pulsed radiation devices. For instance, Ward U.S. Pat. No. 3,445,658 teaches amplifying the pulses generated by a pulsed radiation device with a standard, linear pulse amplifier located within the sonde. These amplified pulses are then coupled to the input of a sequential channel selector which gates the pulses into selected channels. The outputs of the channels are coupled to the input of a telemetry transmission unit which produces groups of time multiplexed pulses position modulated according to the amplitude of the pulses. All of these components, as well as a power supply and a cable distribution and matching apparatus, are located adjacent the pulsed radiation device in the sonde. This bulky, complicated combination of elements generates a signal which may be transmitted without significant attenuation to a distantly located decoder and pulse height analyzer.

Other persons skilled in this art have attempted to discover means for obviating signal loss without having to use bulky, complicated apparatus at the location of the detector. A united States Department of Commerce Research Report entitled "Detection and Measurement of Nuclear Radiation" (identified as NAS-N-S-3105) suggested that the normal preamplifier coupled to and positioned adjacent the detector be replaced with a charge-sensitive preamplifier. Since the output of the charge-sensitive preamplifier is essentially proportional to charge ($q$) alone, the pulse height of its output does not vary with its input capacitance. This allows the experimenter to alter the input signal applied to the charge-sensitive preamplifier and still transmit the output signal over 500 feet or more to the measuring equipment with good results, but the government's suggested apparatus requires that the charge-sensitive preamplifier and a means of supplying power thereto be located near the detector.

I have discovered that the measurement of charge at the output of any device that emits pulsed electric charges allows the place of their measurement to be at a substantially greater distance from their source than if a voltage measurement is made and also obviates the need to locate a charge-sensitive preamplifier near the source. The measurement of charge is the measurement of the product of the voltage across and the capacitance of the conducting means which connects from the device that emits pulsed electric charges to the measuring device. The charge transmitted by such conducting means is significantly less attenuated than the voltage because of the increase in the capacitance of the conducting means with an increase in its length.

As used herein the term "remote" means a distance between the source of pulsed electric charges and the charge sensitive preamplifier which is equal to or greater than the distance at which voltage attenuation makes voltage measurement meaningless and which does not exceed that distance at which the charge sensitive preamplifier provides a meaningful signal to the measuring device.

An object of the present invention is to provide an improved method and apparatus for measuring pulsed electric charges originating at a location remote from the place of measurement.

Another object of the present invention is to provide an improved method and apparatus for the measurement of any pulsed radiation whose source is remote from the place of measurement with greater accuracy and at substantially greater distances than with the methods and apparatus previously used.

A further object of this invention is to provide an improved method and apparatus for the measurement of pulsed radiation at a measuring station remote from the source of pulsed radiation wherein a preamplifier as well as other bulky, complicated components, need not be located near the detector.

Another object is to provide an improved system for measuring any remote pulsed radiation, this system including readily available components.

A further object is to provide an improved method and apparatus for measuring any remote pulsed radiation which has greater simplicity and accuracy than the methods and apparatus previously used.

BRIEF DESCRIPTION OF THE DRAWINGS

These and other objects and advantages of the present invention are hereinafter more fully set forth and explained with reference to the embodiments shown in the drawings wherein.

DESCRIPTION OF THE PREFERRED EMBODIMENTS

Broadly the present invention provides an improved method for measuring pulsed electric charges originating at a location remote from the place of measurement. A particular application of the present invention is the measurement of any pulsed radiation originating at a place remote from the place of measurement. The system for such an application includes a radiation detection device having an output of pulsed electric charges and a suitable means for conducting the pulsed charges from the detection device to a charge sensitive preamplifier distantly located at the place of measurement. The length of the conducting means is limited only by that length which will cause attenuation of the pulsed charges to the degree that they can no longer be measured with meaningful results. The length of the conducting means may be substantially longer when the present invention is used than when prior methods are used. The maximum distance separating the source of any pulsed radiation from the place where a meaningful measurement of it can be made can be substantially more when charge is measured than when voltage is measured.

Figure 1:
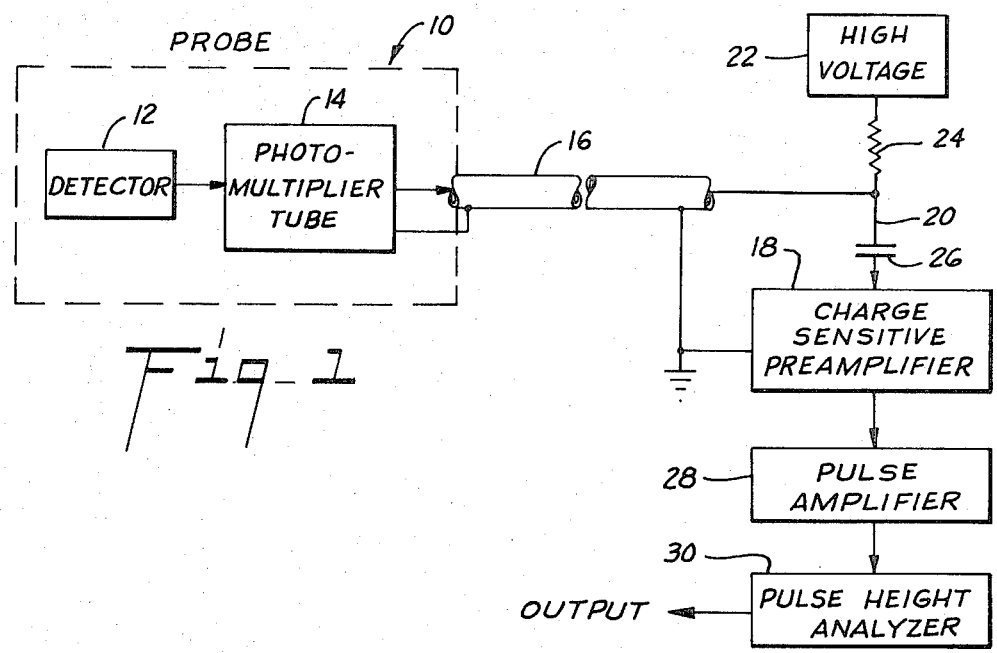
FIG. 1 is a schematic illustration of a radiation measuring system constructed in accordance with the principles of the present invention.

In FIG. 1 the radiation detecting probe 10 is the portion of the system of the present invention which is located remote from the measuring portion of the system. For example, the probe 10 whose components are shown enclosed by the dashed line could be placed in a drill-hole to detect pulsed radiation within said drill-hole. As shown, the probe 10 may include the pulsed radiation detector 12, such as, a sodium iodide pulsed radiation detector manufactured by Hershaw-Chemical Company, connected to the photomultiplier tube 14, such as, an RCA 4440. There is no need according to this invention to locate a preamplifier, time multiplexer or other device adjacent the photomultiplier tube 14 to place the signal in a condition for transmission. Suitable means are of course provided to transmit or conduct pulsed electric charges emanating from said probe 10 to the place of measurement. Such conducting means may be the cable 16 which may be a single or multiple-wire cable as required. The cable 16 is grounded and is connected to charge sensitive preamplifier 18, such as, a Canberra Industries Model 805 Scintillation Preamplifier, by connection to line 20 which extends from the high voltage supply 22, such as, a Hewlett-Packard Model 6516A, to the charge sensitive preamplifier 18 at a point between the resistor 24, typically 100 ohms, and the capacitor 26, typically, 0.1 microfarads. The charge sensitive preamplifier functions to amplify the product of the voltage and the capacitance, that is, the charge, coupled to its input to a level compatible with further amplification. The output from the charge sensitive preamplifier 18 is delivered through the pulse amplifier 28, such as, a Canberra Industries Model 816 Spectroscopy Amplifier, to the pulse height analyzer 30, such as, a Geos Model 8050. Of course, if the amplification provided by the charge sensitive preamplifier 18 is sufficient for the purposes of pulse height analyzer 30, the further amplification (such as by amplifier 28) can be emitted. The output from analyzer 30 provides a measure of the amplitude and rate of the impulses detected by the detector 12.

In this system, the detector 12 may be a thallium activated sodium iodide crystal detector, a thallium activated cesium iodide crystal detector or other detector which responds to pulsed radiation to provide an input to a photomultiplier tube or other device that results in an output of pulsed electric charges. The distance from the pulsed radiation detector 12 that the pulsed electric charges travel to the charge sensitive preamplifier 18 should be such that the pulsed charges are not attenuated to such a degree that the measurement is no longer meaningful. When using the above-described type of detectors, the charge sensitive preamplifier 18 can be located close to the pulse analyzer 30, rather than near the detector, because the pulsed charges from the probe 10 are not attenuated to a degree which would preclude accurate transmission to the charge sensitive preamplifier, amplification by such preamplifier, and analysis by the pulse analyzer 30.

Figure 2:
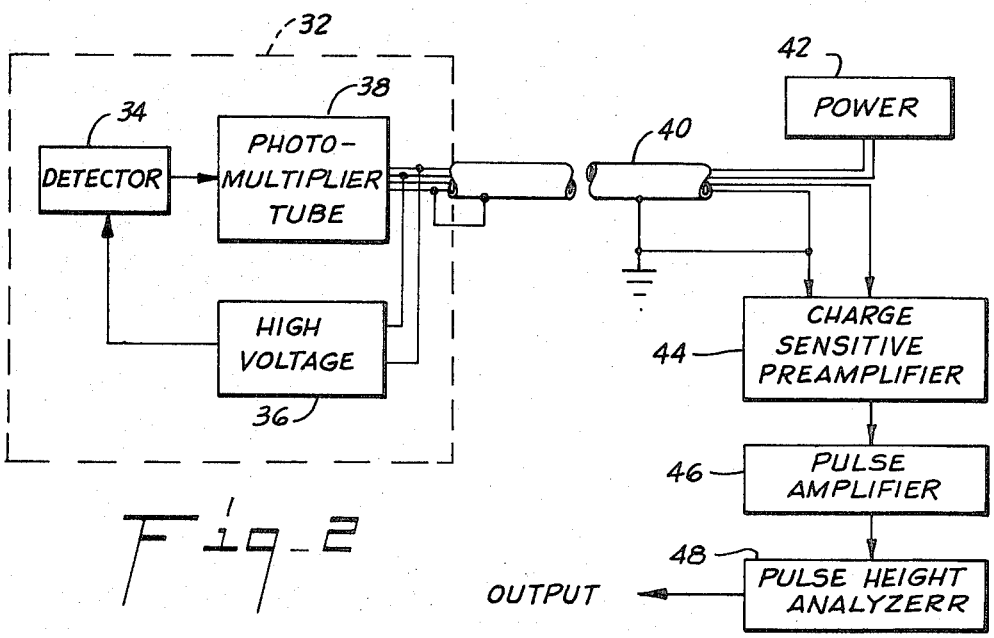
FIG. 2 is a schematic illustration of another radiation measuring system similar to the system shown in FIG. 1 but providing a high voltage source of electric power at the remote detecting device.

In some installations for remote detection and measurement of pulsed radiation it may be desirable to provide high voltage power at the location of the detector and the device that converts the pulsed radiation to pulsed electric charges. Such a system is illustrated in FIG. 2 wherein the high voltage unit 36 is made a part of the probe 32 together with a suitable detector 34 and a suitable means for converting pulsed radiation to pulsed electric charges such as the photomultiplier tube 38. The means for conducting the pulses is a multi-wire cable 40 as shown and provides a connection from the power source 42 to the probe 32. As shown the cable 40 is grounded and the output from the photomultiplier tube 38 is delivered through the conducting means 40, through the charge sensitive preamplifier 44 and the pulse amplifier 46 to the pulse height analyzer 48 wherein the magnitude and frequency of the pulsed charges are measured. As can be seen from the drawings the only difference between the two forms of the invention illustrated is in the location of the high voltage source, the source being at the measuring device in the form illustrated in FIG. 1 and a part of the probe 32 in the form illustrated in FIG. 2.

From the foregoing it can be seen that the system and method of the present invention by avoiding the necessity to measure voltage with its attendant severe attenuation, provides a new and improved measurement of remote pulsed electric charges. The present invention has application to measurement of pulsed radiation originating at a location remote from the measuring location without requiring the use of a preamplifier and other equipment at the detection location. As previously set forth "remote" can be a distance greater than the longest distance from which meaningful voltage measurements can be made and a distance limited only by that length of conducting means along which attenuation prevents meaningful charge measurements.

The foregoing disclosure and description of the invention are illustrative and explanatory thereof, and various changes in the size, shape and materials, as well as in the details of the illustrated construction, may be made within the scope of the appended claims without departing from the spirit of the invention.

What is claimed is:

1. A radiation measuring system for detecting radiation at a detection location and measuring such radiation at a remote measuring location, comprising:
   means for detecting the radiation and generating electric charges responsive thereto, the detecting means being located at the detection location;
   means connected to the output of the detecting means for conducting the electric charges to the remote measuring location;
   means at the measuring location connected to the conducting means for measuring the electric charges and amplifying the electric charges to a predetermined level compatible with the other elements of the measuring system; and
   means at the measuring location connected to the output of the charge amplification means for analyzing the amplified charges.

2. A radiation measuring system for detecting pulsed radiation in a drill hole and measuring such pulsed radiation outside of the drill hole, comprising:
   means for detecting the pulsed radiation and having an output of pulsed electric charges, the detecting means being adapted to be placed into the drill hole;
a charge sensitive preamplifier;
a pulse amplifier;
a pulse analyzer; and
means for conducting pulsed electric charges between the detecting means and the preamplifier and between the preamplifier and the pulse amplifier and between the pulse amplifier and the pulse analyzer;
the charge sensitive preamplifier, the pulse amplifier and the pulse analyzer being outside of the drill hole.

3. A radiation measuring system for detecting pulsed radiation and measuring such pulsed radiation at a measured location remote from the detection location, comprising:
means for detecting pulsed radiation and generating pulsed electric charges responsive thereto located at the detecting location;
a charge sensitive preamplifier;
a pulse amplifier;
a pulse analyzer; and
means for conducting pulsed electric charges between the detecting means and the preamplifier and between the preamplifier and the pulse amplifier and between the pulse amplifier and the pulse analyzer;
the charge sensitive preamplifier, the pulse amplifier and the pulse analyzer being located at the measuring location remote from the detection location.

4. A radiation measuring system according to claim 3, wherein
said radiation detecting means includes a radiation sensitive detector having a light flash response and a photomultiplier tube to provide a pulsed output responsive to the light flashes of said detector.

5. A radiation measuring system according to claim 4 wherein
said detector is a sodium iodide, thallium activated crystal.

6. A radiation measuring system according to claim 4 wherein
said detector is a cesium iodide, thallium activated crystal.

7. A radiation measuring system according to claim 4 including:
a high voltage supply located at said detection location for supplying voltage to said detector;
a power source at the end of said measuring location; and
conducting means for connecting said power source and said high voltage supply.

8. A radiation detecting and measuring apparatus comprising:
means for detecting radiation having an output of pulsed electric charges;
a charge sensitive preamplifier remotely located from the detecting means;
a pulse amplifier connected to the charge sensitive preamplifier;
a pulse analyzer connected to the pulse amplifier; and
means for transmitting the pulsed charges from the detecting means to the charge sensitive preamplifier.

* * * * *